US005624341A

United States Patent [19]

Park

[11] Patent Number: 5,624,341

[45] Date of Patent: Apr. 29, 1997

[54] HYDRAULIC CONTROL SYSTEM OF AUTOMATIC TRANSMISSION FOR VEHICLES

[75] Inventor: Jongsul Park, Seoul, Rep. of Korea

[73] Assignee: Hyundai Motor Company, Rep. of Korea

[21] Appl. No.: 493,027

[22] Filed: Jun. 21, 1995

[30] Foreign Application Priority Data

Jun. 22, 1994 [KR] Rep. of Korea .................. 94-14211

[51] Int. Cl.⁶ ........................................... B60K 41/10
[52] U.S. Cl. .................................... 475/119; 475/128
[58] Field of Search ......................... 475/119, 128; 477/125

[56] References Cited

U.S. PATENT DOCUMENTS

| | | | |
|---|---|---|---|
| 3,709,064 | 1/1973 | Schaefer et al. | 475/119 |
| 4,541,308 | 9/1985 | Person et al. . | |
| 4,742,732 | 5/1988 | Hiramatsu . | |
| 4,756,213 | 7/1988 | Mainquist et al. . | |
| 5,085,103 | 2/1992 | Ando et al. . | |
| 5,288,279 | 2/1994 | Sakai et al. | 475/128 |
| 5,538,479 | 7/1996 | Nijama | 475/128 |

FOREIGN PATENT DOCUMENTS

3917401A1 of 1989 Germany .

*Primary Examiner*—Dirk Wright
*Attorney, Agent, or Firm*—Finnegan, Henderson, Farabow, Garrett & Dunner, L.L.P.

[57] ABSTRACT

A hydraulic control system of automatic transmission for vehicles includes a torque converter control part having a damper clutch control solenoid valve and a regulator valve; a manual valve for supplying an oil pressure to another lines according to a shift lever's position; a first, a second, and a third indirect control valves, to which the oil pressure is supplied if the manual valve is set in drive "D" range; a first, a second, and a third solenoid valves, each of which controls the indirect control valves, respectively; a first friction element communicating with the first indirect control valve; a second friction element communicating with the second indirect control valve; a third friction element communicating with the second indirect control valve; a fourth friction element communicating with the third indirect control valve; a switch valve for supplying an operating pressure to the second friction element in drive "D" range and supplying the operating pressure to the third friction element in "L" range selectively; and a safety valve which is connected to the switch valve and prevents a gear train from locking when the operating pressure is applied to the friction elements simultaneously.

7 Claims, 12 Drawing Sheets

FIG.12

|  |  | 30 | 36 | 40 | S1 |
|---|---|---|---|---|---|
|  |  | 24,56 | 46,48 | 50 | 10 |
| P |  | ON | OFF | OFF | OFF |
| P → R |  | 100% → 0% | OFF | OFF | OFF |
| R |  | OFF | OFF | OFF | OFF |
| N → R |  | 100% → 0% | ON → OFF | — | — |
| N |  | ON | ON | OFF | OFF |
| N → D |  | 100% → 0% | — | — | — |
| Constant speed stages | 1 | OFF | ON | OFF | OFF |
|  | 2 | OFF | ON | ON | ON |
|  | 3 | OFF | OFF | OFF | ON |
|  | 4 | ON | OFF | ON | ON |
| Shifting speed stages | 1→2 | — | — | 0% →100% | OFF |
|  | 2→3 | — | 100% → 0% | 100% → 0% | OFF |
|  | 3→4 | 0% →100% | — | 0% →100% | OFF |
|  | 2→4 | 0% →100% | 100% → 0% | — | OFF |
|  | 4→3 | 100% → 0% | — | 100% → 0% | OFF |
|  | 3→2 | — | 0% →100% | 0% →100% | OFF |
|  | 2→1 | — | — | 100% → 0% | OFF |
|  | 4→2 | 100% → 0% | 0% →100% | — | OFF |
| 2 | 1 | OFF | ON | OFF | OFF |
|  | 2 | OFF | ON | ON | ON |
|  | 1→2 | — | — | 0% →100% | OFF |
|  | 2→1 | — | — | 100% → 0% | OFF |
| L |  | OFF | Duty control | OFF | OFF |

HYDRAULIC CONTROL SYSTEM OF AUTOMATIC TRANSMISSION FOR VEHICLES

BACKGROUND OF THE INVENTION

1. Field of the Invention

The invention relates to a hydraulic control system of automatic transmission for vehicles and, more particularly, to the hydraulic control system of automatic transmission for vehicles that can perform a skip shift via independent/indirect control and minimize the drive loss of oil pump by means of varying line pressure.

2. Description of the Prior Art

A hydraulic control system of automatic transmission for vehicles controls an output revolution number of planetary gear unit by means of adjusting the operation of clutches and brakes provided in a gear train.

To adjust the operation of the clutches and brakes, the hydraulic control system controls solenoid valves through on/off or duty rate control according to the vehicle speed and load. the control of the solenoid valves forces an oil pressure to flow along a certain line or obstructs the flow of the oil pressure or changes the direction of the flow of the oil pressure.

Accordingly, the oil pressure produced in the oil pump flows along a selected flow way and then applies or releases clutches.

But it is difficult in a the conventional hydraulic control system of automatic transmission for vehicles to perform a skip shift since it is an indirect method of control. as a result, the conventional hydraulic control system has a disadvantage of slow response, i.e. it dosennot respond instantaneously to a driver's intention.

Moreover, since a regulator valve, which regulates the oil pressure to a constant line pressure, adjusts the line pressure only in driving forward and rearward, a line pressure suitable for all driving conditions is used, particularly in driving forward. as a result, more oil pressure than is needed is applied to the clutches at forward third or foruth speed stage and therefore the drive loss of the oil pump is increased. further the load of the oil pump is increased that it has negative affects on fuel consumption ratio.

SUMMARY OF THE INVENTION

The invention has been made in an effort to solve the above problems.

It is an object of the invention to provide a hydraulic control system of automatic transmission for vehicles that can perform skip shift via independent/indirect control and vary a line pressure in accordance with vehicle speed.

To achieve the above object, the invention provides a hydraulic control system of automatic transmission for vehicles comprising: a torque converter control part including a damper clutch control solenoid valve for increasing power transfer efficiency according to vehicle speed and load and a regulator valve which regulates an oil pressure produced in an oil pump to the constant oil pressure; a manual valve for supplying the oil pressure supplied from the oil pump to another lines according to a shift lever's position; a first indirect control valve, a second indirect control valve, a third indirect control valve, in which the oil pressures are supplied to all of the indirect control valves if the manual valve is set in drive "D" range; a first solenoid valve, a second solenoid valve, a third solenoid valve, in which each of the solenoid valves controls the respective indirect control valve; a first friction element communicating with the first indirect control valve, a second friction element communicating with the second indirect control valve, a third friction element communicating with the second indirect control valve, a fourth friction element communicating with the third indirect control valve; a switch valve for supplying an operating pressure to the second friction element in drive "D" range and supplying the operating pressure to the third friction element in "L" range selectively; and a safety valve which is connected to the switch valve and prevents a gear train from locking when the operating pressure is simultaneously applied to the friction elements,

BRIEF DESCRIPTION OF THE DRAWINGS

FIG. 12 is a view showing solenoid valve control table for the hydraulic control system in a preferred embodiment of the invention.

DETAILED DESCRIPTION OF A PREFERRED EMBODIMENT

Now, a preferred embodiment of the invention will be described with reference to the drawings.

Figure 1:
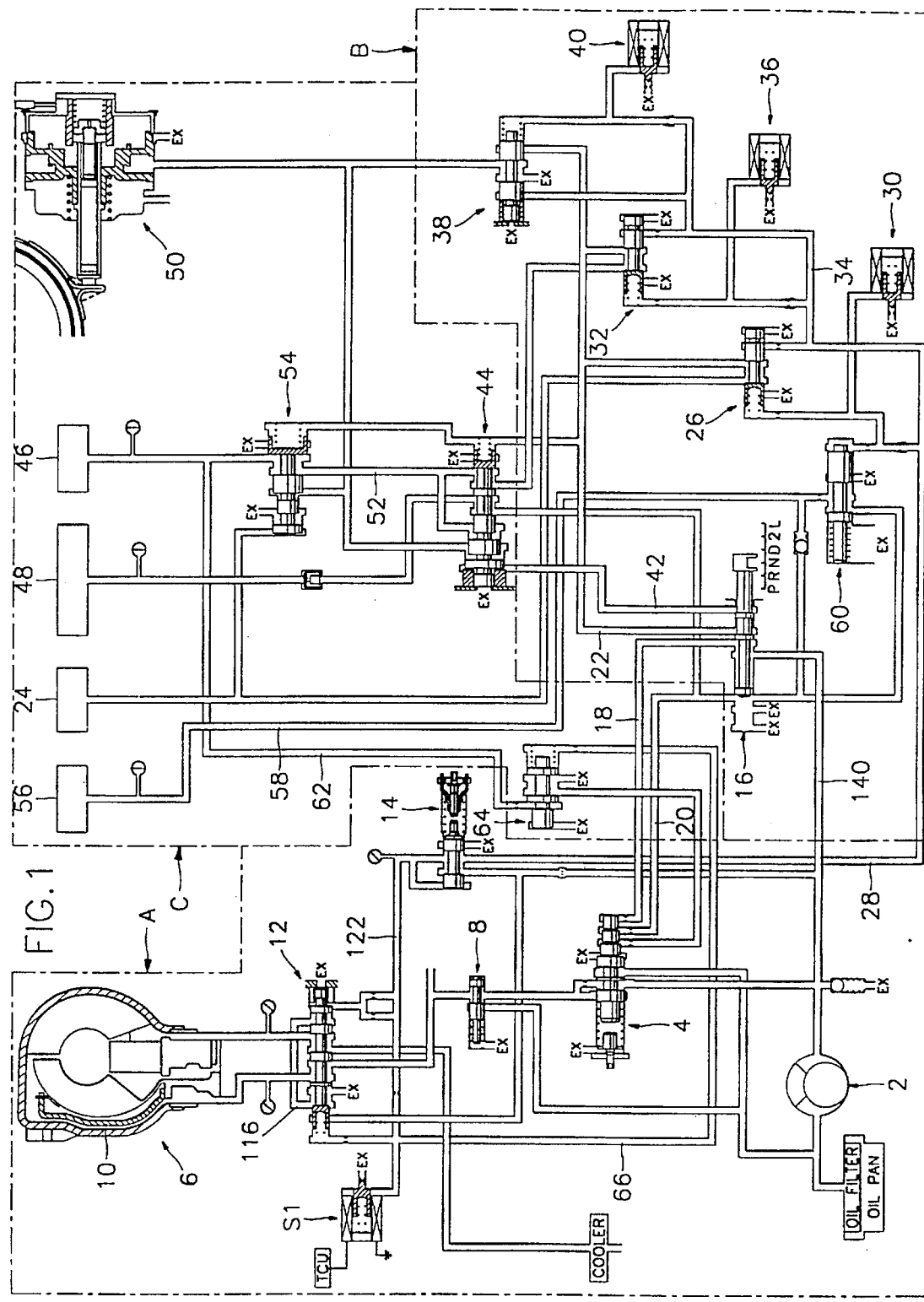
FIG. 1 is a schematic diagram of a hydraulic control system in a preferred embodiment of the invention.

FIG. 1 is a schematic diagram of the hydraulic control system according to the invention showing an oil pump 2 and a regulator valve 4 which regulates an oil pressure produced in the oil pump to a constant line pressure.

A torque converter 6 includes a turbine and an impeller which perform power transfer through fluid and a torque converter control valve 8 which controls the oil pressure used in the torque converter is connected to the regulator valve 4.

The torque converter 6 includes a damper clutch 10 to increase power transfer efficiency and the operation of the damper clutch 10 depends on a damper clutch control valve 12 arranged between the torque converter 6 and the torque converter control valve 8.

The damper clutch control valve 12 performs port changes by the oil pressure adjusted by a reducing valve 14, and the port changes are accomplished through the duty control of a damper clutch control solenoid valve S1 which is controlled by a transmission control unit.

Figure 2:
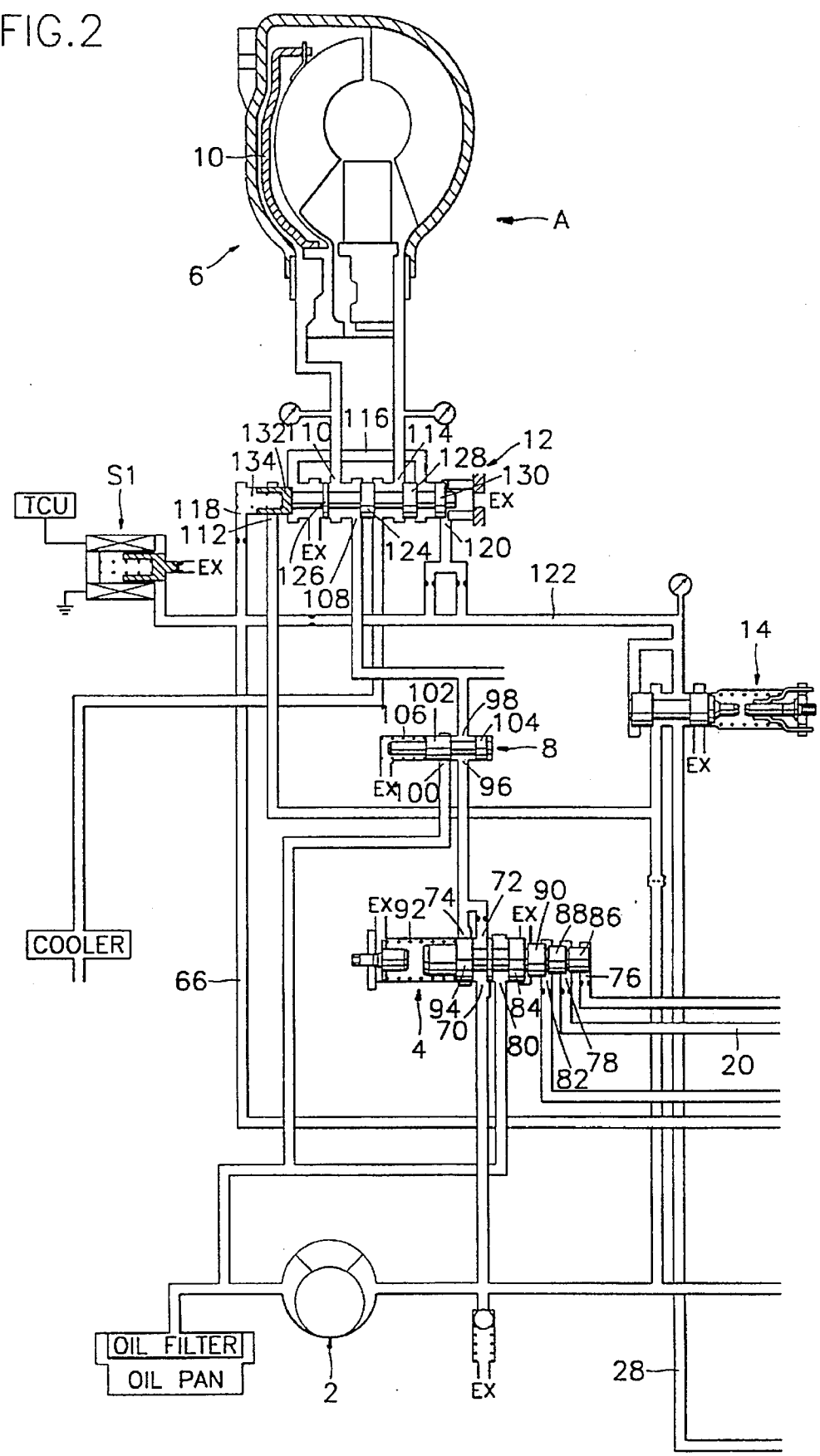
FIG. 2 is a detail view of a torque converter control part for the hydraulic control system in a preferred embodiment of the invention.

A toque converter control part A is composed of the above valves and the connection therebetween as shown in detail in FIG. 2.

A manual valve 16 is connected to the regulator valve 4 through a first line 18 for adjusting the line pressure in driving forward and through a second line 20 for adjusting the line pressure in driving rearward.

A third line 22 in which the line pressure flows when the manual valve 16 is set in the drive "D" range is connected to a first indirect control valve 26 which controls a first friction element 24.

The first indirect control valve 26 is connected to the reducing valve 14 through a fourth line 28 and the oil pressure flowing through the fourth line works as a control pressure of the first indirect control valve 26.

To work the oil pressure flowing through the fourth line as the control pressure, the forth line 28 is provided with a first solenoid valve 30 and the first solenoid valve 30 is duty controlled by the transmission control unit to exhaust or form the oil pressure in the fourth line 28.

The third line 22 is connected to a second indirect control valve 32 and the second indirect control valve 32 is controlled by the oil pressure flowing to a fifth line 34.

The fifth line 34 is provided with a second solenoid valve 36 and the second solenoid valve 32 is duty controlled by the transmission control unit to exhaust or form the oil pressure in the line.

The third line 22 is extended to have a connection with a third indirect control valve 38 and the third indirect control valve 38 is controlled by a third solenoid valve 40 which exhausts or forms the oil pressure from the fifth line 34.

The third indirect control valve 38 composes a indirect valve control part B with above compositions as shown in FIG. 1.

Figure 3:
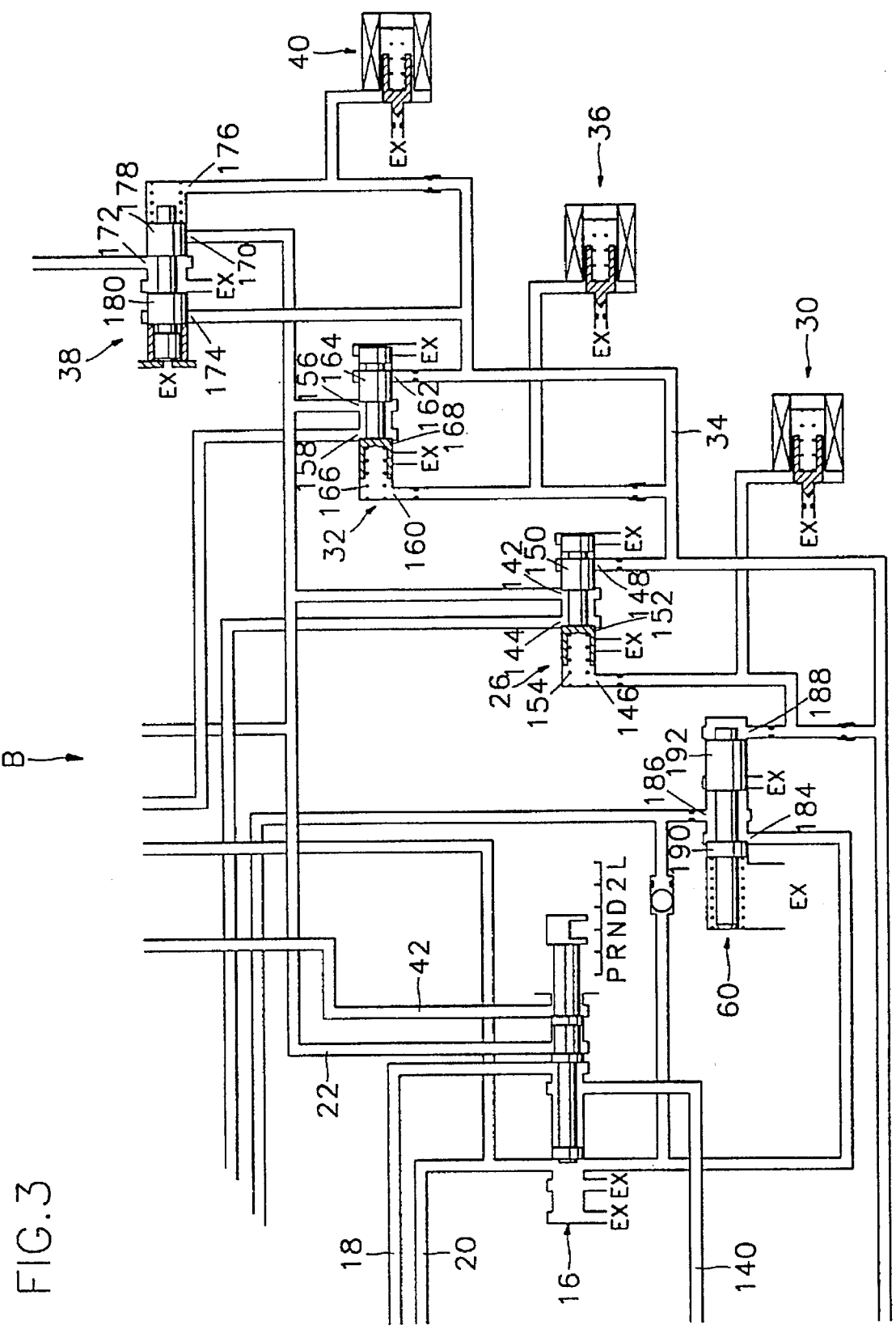
FIG. 3 is a detail view of a valve indirect control part for the hydraulic control system in a preferred embodiment of the invention.

The indirect valve control part B is shown in detail in FIG. 3, and substantially, three solenoid valves control friction elements respectively and independently.

A switch valve 44 which is connected with the third line 22 and connected to the manual valve 16 through a sixth line 42 supplies the oil pressure to a second friction element 46 in the "D" range or supplies oil pressure to a third friction element 48 in "L" range.

The condition under which oil pressure to the third friction element 48 can be supplied is that the third indirect control valve 38 does not supply oil pressure to a fourth friction element 50 and there is no oil pressure operating the fourth friction element 50.

A safety valve 54 which is connected to the switch valve 44 through a seventh line 52 prevents the locking of the gear train when the oil pressure is applied to the first, second and fourth friction elements 24, 46, 50 at the same time and forms a safety circuit part C.

A fifth friction element 56 which operates to move the vehicle rearward is connected to the manual valve 16 through an eighth line 58 for to which the oil pressure is supplied in "R" range and the eighth line is provided with a fourth indirect control valve 60 to perform port change by means of the control of the first solenoid valve 30.

And as a means for varying the line pressure at the third or forth speed stage in the "D" range, the invention supplies the oil pressure, which is a part of the oil pressure supplied to the second friction element 46, through a ninth line 62 into a line pressure control valve 64.

To control the line pressure control valve 64, the line pressure control valve 64 is connected to the damper clutch control solenoid valve S1 through a tenth line 66, then it makes the oil pressure supplied to the ninth line 62 operative or inoperative to the regulator valve 4.

FIG. 2 is a detail view of the torque converter control part A in the preferred embodiment of the invention, in which regulator valve 4 is formed in a valve body and includes a first port 70 for being supplied oil pressure from the oil pump 2, second and third ports 72, 74 for supplying the oil pressure into the torque converter control valve 8, fourth and fifth ports 76, 78 communicating with the first and second lines 18, 20 respectively, sixth port 80 for returning the oil pressure to oil pump 2 at times of the line pressure control, and a seventh port 82 communicating with the line pressure control valve 64.

And a valve spool of the regulator valve includes a first land 84 movable between the first port 70 and the sixth port 80 for returning or obstructing the supplied oil pressure, and second, third, and fourth lands 86, 88, 90 each of which is forced by the oil pressure supplied from the fourth, fifth, and the seventh ports, respectively.

The left end of the valve spool in the FIG. 2 is biased by a resilient member 92 and there is provided with a fifth land 94 for arranging the resilient member 92 which obstructs the oil pressure flowing to the third port 74 selectively.

The torque converter control valve 8 forms a first port 96 connected with the second and third ports 72, 74 in the valve body and includes a second port 98 for supplying the oil pressure to the damper clutch control valve 12 and a third port 100 for making a lower pressure than the line pressure.

A valve spool of the toque converter control valve has a first land 102 for obstructing the third port 100 selectively and a second land 104 for moving the valve spool to left in order to open the third port 100.

In the second land 104, there is a hole for applying oil pressure to the right side of the land and a resilient member 106 is biased in the first land 102 to move the valve spool to the right if the oil pressure applied to the right side of the second land is lower than the pressure produced by the resilient member 106.

The damper clutch control valve 12 has a first port 108 communicating with the second port 98 in the torque converter control valve 8 and a second port 110 for supplying the oil pressure flowing to the first port 108 into the rear side of the damper clutch 10 in the torque converter 6.

And the damper clutch control valve 12 also has a third port 112 to which oil pressure is supplied directly from the oil pump and a forth port 114 which supplies the oil pressure flowing in through the third port 112 to the front side of the damper clutch of the torque converter.

There is a by-pass passage between the third and fourth ports which can supply the oil pressure flowing into the third port to the fourth port.

Also, a fifth port 118 and a sixth port 120 are provided in the left and right sides of the damper clutch control valve 12, respectively, and these ports are connected with an eleventh line 122 in which reduced pressure from the reducing valve 14 flows.

The eleventh line 122 is provided with the clutch control solenoid valve S1 which is duty controlled by the transmission control unit and the solenoid valve S1 exhausts or forms the oil pressure in the line.

A valve spool of the damper clutch control valve 12 includes a first land 124 for opening or shutting the first port 108 and the second port 110 selectively, a second land 126 for exhausting the oil pressure of the second port 110 through an exhausting port EX and a third land 128 for opening or shutting the fourth port 114.

Also, the above valve spool includes a fourth land 130 to which the oil pressure flowing in the sixth port 120 is applied and a fifth land 132 to which the oil pressure flowing in the fifth port 118 is applied and the fifth land is a plug type, wherein a resilient member 134 is provided.

When the damper clutch control solenoid valve S1 is controlled to duty rate 0%, the valve spool of the damper clutch control valve 12 is moved to right by the force of resilient member 134 plus the oil pressure flowing to the fifth port 118 then the first port 108 communicates with the second port 110.

Accordingly, the oil pressure which flows through the second and third ports of the regulator valve 4 and through the second ports 98 of the torque converter control valve 8 flows into the rear side of the damper clutch 10 of the torque converter 6 and prevents the operation of the damper clutch.

And when the damper clutch control solenoid valve S1 is controlled to duty rate 100%, since the oil pressure applied to the fifth port 118 is vanished, the valve spool is moved to left by the oil pressure applied to the fourth land 130 and the by pass passage 116 communicates with the third port 112 and then the oil pressure flowing through the fourth port 114 operates the damper clutch 10.

At this time, the oil pressure working as a clutch operating pressure is supplied from a line connecting the oil pump to the reducing valve 14 and the operation of the damper clutch 10 is accomplished by means of the control of the damper clutch solenoid valve S1 which is controlled by the transmission control unit in high power transfer efficiency needed range.

As shown in FIG. 3, the oil pressure produced in the oil pump is supplied to the manual valve 16 through the twelfth line 140 and the oil pressure supplied to the twelfth line 140 is supplied to only the first line 18 when the manual valve 16 is set in "N" range.

When the manual valve 16 is set in "D" range, the oil pressure in the twelfth line 140 flows to the third line 22 and the oil pressure flowing in the third line 22 is supplied to the first, second, and third indirect control valves 26, 32, and 38 at the same time.

The first indirect control valve 26 includes a first port 142 connecting the third line 22, a second port 144 supplying the oil pressure flowed into the first port 142 into the first friction element 24, and third and fourth ports 146, 148 to which the oil pressure is supplied from the fourth line 28 and the valve spool of the first indirect control valve 26 has a first land 150 for opening or shutting the first port 142 and a plug type second land 152.

The plug type second land 152 is biased by a resilient member 154 to force the valve spool to move to left.

The second indirect control valve 32 includes a first port 156 communicating with the third line 22, a second port 158 supplying the oil pressure flowed into the first port to the switch valve 44, and third and fourth ports 160, 162 to which the control pressure is supplied from the fifth line 34 connected with the fourth line 28.

The valve spool of the second indirect control valve 32 is provided with a first land 164 for opening or shutting the first port 156 and a second land 168 which is a plug type and biased by a resilient member 166.

The third indirect control valve 38 includes a first port 170 to which the oil pressure is supplied from the third line 22, a second port 172 supplying the oil pressure flowed into the first port to the fourth friction element 50 directly, and third and fourth ports 174, 176 to which the oil pressure is supplied from the fifth line 34.

The valve spool of the third indirect control valve 38 has a first land 178 for opening or shutting the first port 170 and a second land 180 for opening or shutting the third port 174 and the valve spool is biased by a resilient member 174 in the right side end.

And the fourth indirect control valve 60 includes a first port 184 to which the oil pressure is supplied from the manual valve 16, a second port 186 supplying the oil pressure flowed into the first port to the fifth friction element 56 operating in driving rearward, and a third port 188 to which the control is supplied from the fourth line 28.

The valve spool of the fourth indirect control valve 60 has a first land 190 for opening or shutting the first port 184 and a second land 192 to which the oil pressure flowed into the third port 188 is applied.

Figure 4:
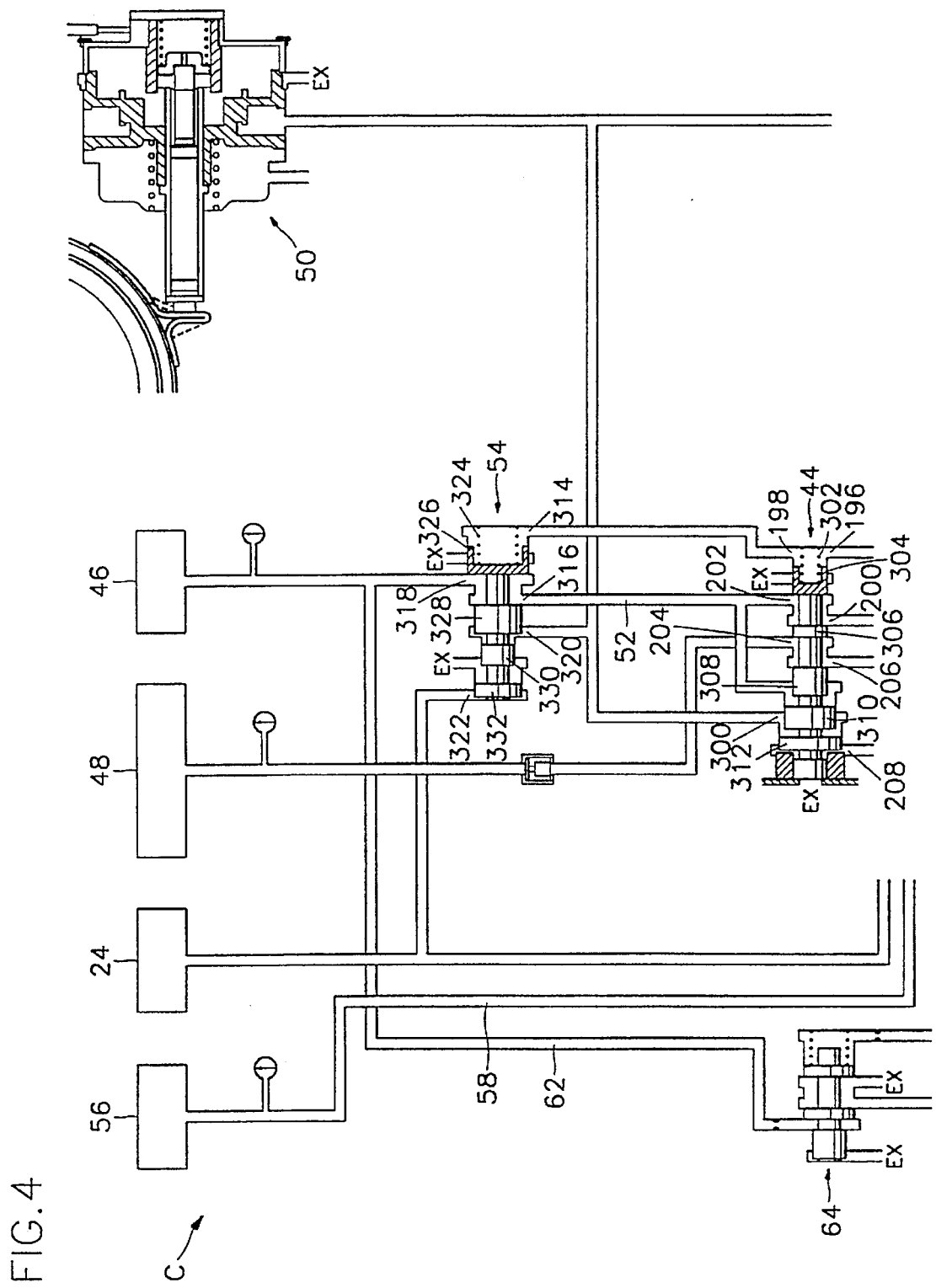
FIG. 4 is a detail view of a safety circuit part for the hydraulic control system in a preferred embodiment of the invention.

FIG. 4 is a detail view of a safety circuit part C, the switch valve 44 includes a first port 196 to which the oil pressure is supplied from the third line 22 and supply the oil pressure flowed to the first port to the safety valve 54, a second port 300 to which the oil pressure is supplied for moving the valve spool to left in order to prevent the oil pressure from supplying to the third friction element when there is operating pressure for the fourth friction element, a third port 200 to which the oil pressure is supplied from the second port 158 of the second in direct control valve 32, a forth port 202 supplying the oil pressure flown to the third port into the seventh line 52, a fifth port 204 supplied the oil pressure from the second port 158 of the second indirect control valve 32, a fourth port 202 supplying the oil pressure flowed to the third port into the seventh line 52, and a fifth port 204 supplying the oil pressure flowed to the third port into the third friction element 48.

Also, the switch valve includes a sixth port 206 supplying the oil pressure into the fifth port 204 when the manual valve is set in the reverse "R" range, and a seventh port 208 to which the oil pressure is supplied for moving a valve spool to right to supply the oil pressure in the third port 200 into the fifth port 204 when the manual valve is set in the "L" range.

The valve spool of the switch valve 44 is biased by a resilient member 302 at the right side end, and has a plug type first land 304, in which the resilient member is biased, for opening or shutting an exhausting port EX, and a second land 306 which moves to right or left centering around the third port 200 to supply the oil pressure in the third port into the fourth port 202 or fifth port 204 selectively.

And the valve spool of the switch valve 44 also includes a third land 308 for supplying the oil pressure in the sixth port 206 into the fifth port 204 or obstructing the oil pressure in the sixth port 206 by opening or shutting the sixth port 206, and a fourth land 310 wherein the oil pressure in the second port 202 is applied to the right side of the land 310 and the oil pressure in the eighth port 300 is applied to the left side of the land 310, and a fifth land 312 in which the oil pressure in the seventh port 208 is applied to the left side of the land 312 and the oil pressure in the eighth port 300 is applied to the right side of the land 312.

And the safety valve 54 includes a first port 314 communicating with the second port 198 of the switch valve 44, a second port 316 supplied the oil pressure by means of communicating with the fourth port 202 of the switch valve 44, and a third port 318 for supplying the oil pressure flowed into the second port to the second friction element 46.

Also the safety valve 54 includes a fourth port 320 communicating with the second port 172 of the third indirect control valve 38 and the eighth port 300 of the switch valve 44, and a fifth port 322 communicating with the second port 144 of the first indirect control valve 26.

The valve spool of the safety valve 54 has a plug type first land 326 biased by a resilient member 324 in the right side end, a second land 328 for opening or shutting the second port 316, a third land 330 having smaller area than that of the second land, and a fourth land 332 to which the oil pressure flown into the fifth port 322 is applied.

When the vehicle is started, the oil pressure is produced from the oil pump and flows toward the regulator valve 4 and the manual valve 16.

Figure 5:
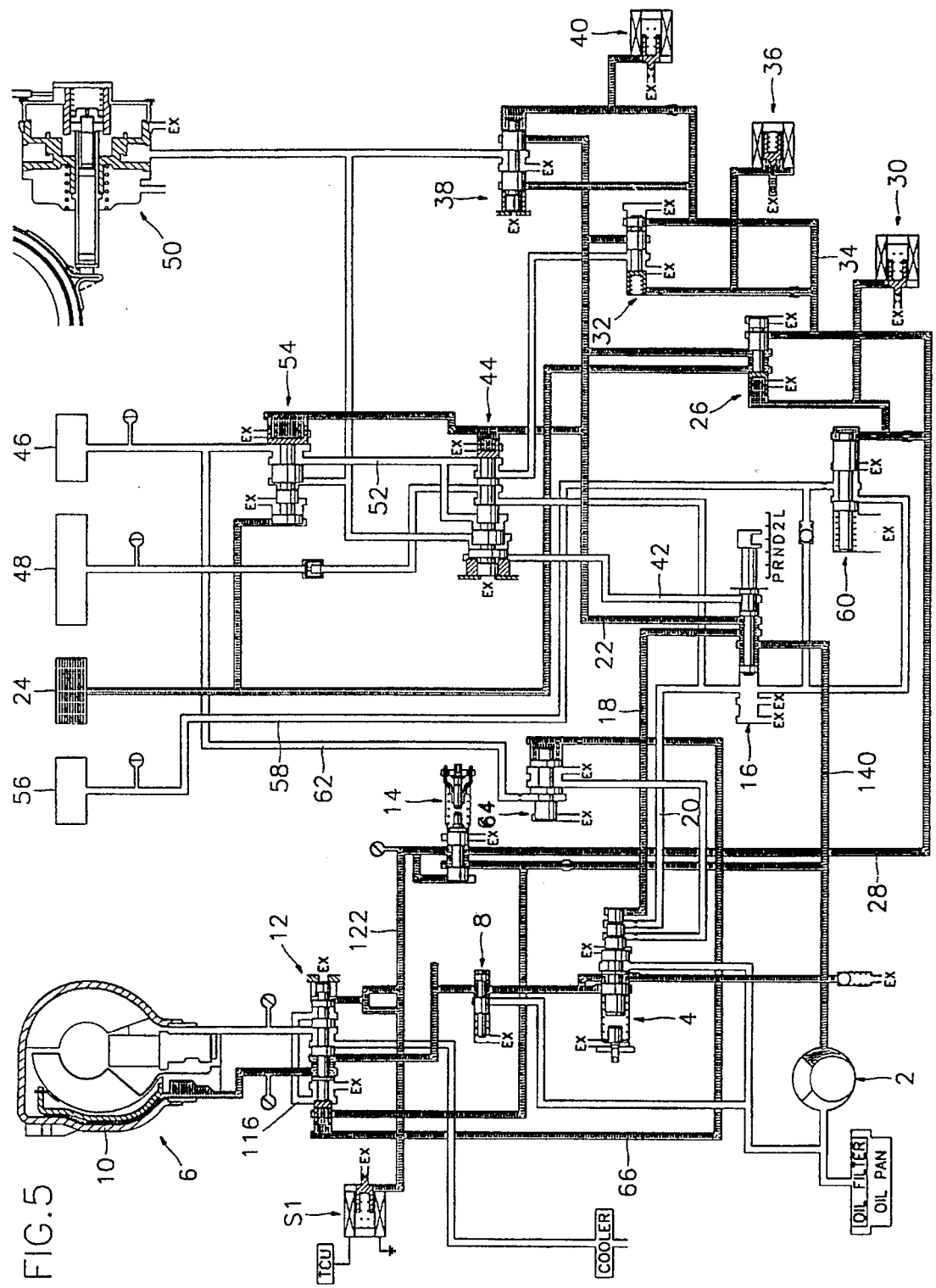
FIG. 5 is a view showing oil pressure control state of the hydraulic control system at the first speed stage in drive "D" range.

At this time, if a driver shifts a shifting lever into drive "D" range, as shown in FIG. 5, the oil pressure flowing to the twelfth line 140 passes the manual valve and flows along the first line 18 and the third line 22.

And a part of the oil pressure is supplied into the reducing valve 14 and then is supplied to the first indirect control valve 26 and the fourth indirect control valve 60 through the fourth line 28.

The oil pressure flowing to the first line 18 is applied to the right side of the second land 86 of the regulator valve 4, and it moves the valve spool to left a little.

As a result, the second land 84 moves to the left side of the first port 70 then the first port 70 communicates with the sixth port 80.

Therefore, a part of the oil pressure produced in the oil pump returns to an oil fan through the sixth port 80 and the line pressure is adjusted.

And the oil pressure flowing to the third line 22 is separated into the first ports 142, 156, and 170 of the first indirect control valve 26, the second indirect control valve 32 and the third indirect control valve 38, respectively.

At this time the first solenoid valve 30 is duty controlled to off state from on state by the transmission control unit.

By this duty control, the oil pressure flowing into the third port 146 of the first indirect control valve 26 through the fourth line 28 is applied to the second land 152 then the valve spool of the first indirect control valve 26 moves to right in view of the figure.

Since the first solenoid valve 30 is duty controlled, the oil pressure formed in the third port 146 of the first indirect control valve 26 is increased slowly.

Accordingly, the valve spool of the first indirect control valve moves to the right side slowly, then the opening area of the first port is increased gradually and the oil pressure is supplied to the first friction element operating at the first speed stage in "D" range through the second port 144.

At this time, since the second solenoid valve 36 is controlled to duty 100% on state, the oil pressure flowing along the fifth line which is extended from the fourth line 28 is entirely exhausted.

As a result, since the oil pressure applied to the third port 160 of the second indirect control valve 32 is vanished, the resilient member 166 is compressed by the oil pressure flowed into the fourth port 164 and the valve spool moves to left. consequently, the first land 164 obstructs the first port 156 of the second indirect control valve 32 and the third solenoid valve 40 is controlled to duty 0% off state and then the oil pressure is supplied to the fourth port 176 of the third indirect control valve 38, as a result, the valve spool is moved to left.

Accordingly, the first port 170 of the third indirect control valve 38 is obstructed by the first land 178 and the oil pressure flowing to the third line 22 does not flow any more.

The oil pressure flowing from the third line 22 to the switch valve 44 is flowed to the first port 196 to move the valve spool to left and is flowed to the first port 314 of the safety valve 54 to move its valve spool to left.

At this time, the damper clutch control solenoid valve S1 is controlled to duty 0% off state and forms the oil pressure in the fifth port 118 of the damper clutch control valve 12.

Then the valve spool of the damper clutch control valve 12 is forced to move to right to communicate the first port 108 with the second port 110, so the damper clutch 10 of the torque converter 6 does not operate.

At this first speed stage, if the vehicle speed increases and then the opening of a throttle valve is increased, the transmission control unit keeps the first, second solenoid valves 30, 36 on the first speed stage controlled state and controls the third solenoid valve 40 to duty 100% on state.

Then the oil pressure flowing from the fifth line 34 to the fourth port 176 of the third indirect control valve is exhausted and the valve spool is moved to right by means of the oil pressure flowed into the third port 174.

As a result of the above control, the oil pressure flowed to the first port 170 of the third indirect control valve 38 from the third line 22 passes through the second port 172 and a part of the oil pressure is supplied to the operating chamber of the fourth friction element 50 and another part of the oil pressure is supplied to the second port 300 of the switch valve 44 and to the fourth port 320 of the safety valve 320.

Howevwe, as the valve spools of the switch valve 44 and the safety valve 54 is in left moved position, the oil pressure supplied to the switch valve 44 and the safety valve 54 stays there.

Figure 6:
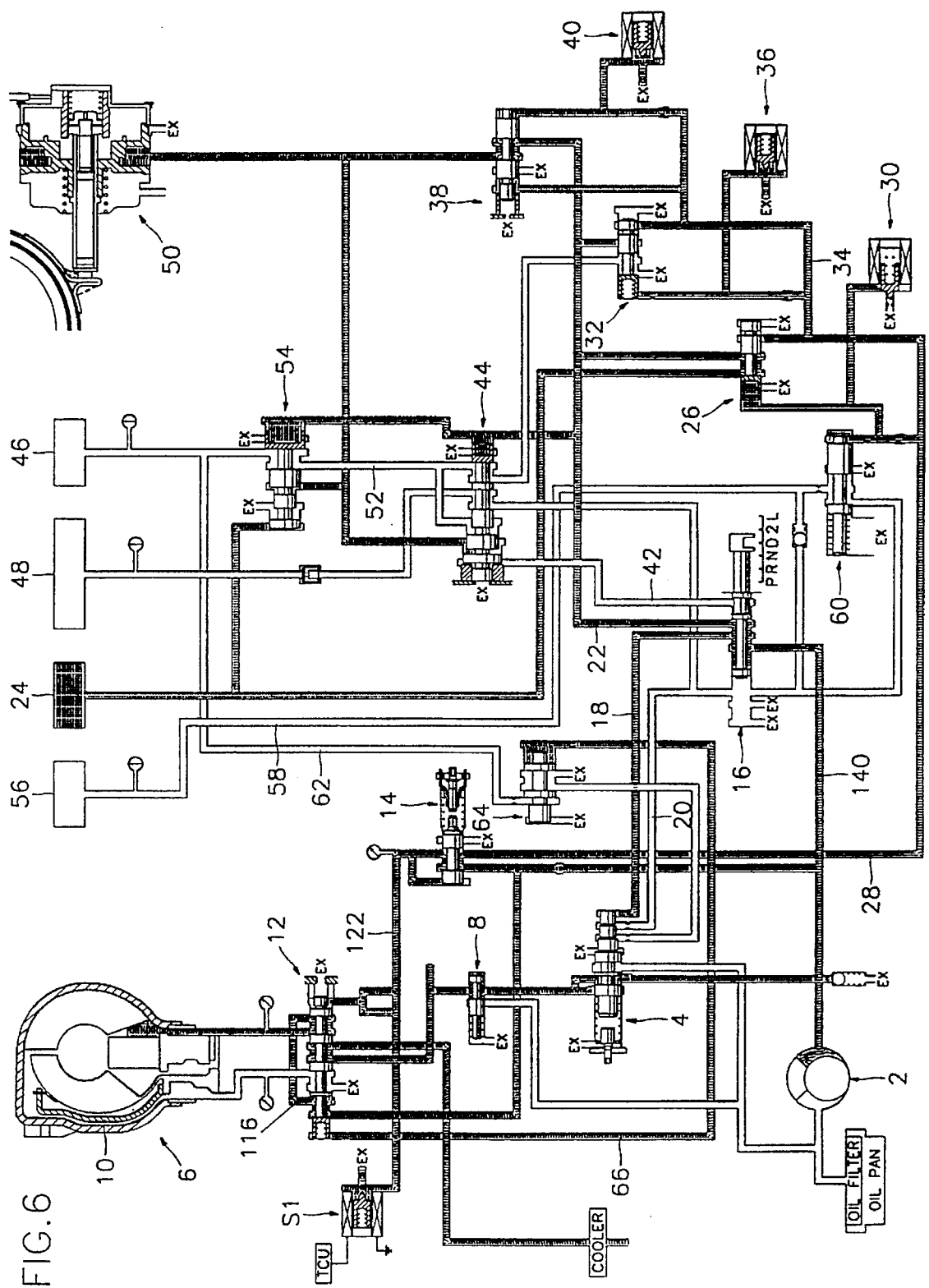
FIG. 6 is a view showing oil pressure control state of the hydraulic control system at the second speed stage in drive "D" range.

At this time, since the first solenoid valve 30 is controlled as in the first speed stage, the first friction element 24 operates then it is possible to perform second speed stage control in "D" range, wherein the first friction element 24 and fourth friction element 50 operate (refer to FIG. 6).

And the damper clutch control solenoid valve S1 is controlled to duty 100% on state then the oil pressure supplied to the fifth port 118 of the damper clutch control valve 12 through the eleventh line 122 is vanished, so the valve spool is moved to left by the oil pressure flowed to the sixth port 120 to communicate the third port 112 with the by pass passage 116.

And the damper clutch 10 operates.

At this second speed stage, if vehicle speed increases and then the opening of the throttle valve is increased, the transmission control unit keeps the first solenoid valve 30 on the second speed stage state and controls the second and third solenoid valves 36, 40 to duty 0% off state.

Since the oil pressure exhausted by the second solenoid valve 36 is obstructed, the oil pressure is formed at the third port 160 of the second indirect control valve 32 to move the valve spool to right.

Therefore the first port 156 communicates with the second port 158 and the oil pressure in the third line 22 flows to the third port 200 of the switch valve 44 through the first and second ports 156, 158.

At this time, since the valve spool of the switch valve 44 is in the left moved position, the oil pressure flowed to the third port 200 flows to the second port 316 of the safety valve 54 through the fourth port 202.

The oil pressure flowed to the second port 316 of the safety valve 54, since its valve spool is moved to left, is supplied to the second friction element 48 through the third port 318.

And the first friction element 24 operating at the first and second speed stages continues to operate and performs the third speed stage control and, at this time, the fourth friction element 50 operating in the second speed stage is released.

The third solenoid valve 40 is controlled to off state to obstruct the exhausting oil pressure and the oil pressure is formed in the fourth port 176.

The oil pressure formed in the fourth port 176 enables the release of the fourth friction element 50 by moving the valve spool to left.

That means, if the valve spool of the third indirect control valve 38 is moved to left, the first land 178 obstructs the first port 170 and, at the same time, the second land 180 is moved to the left of the exhausting port EX to communicate with the second port 172 and then the operating pressure of the forth friction element 50 is exhausted through the exhausting port EX.

At this time, the damper clutch 10 keeps the same operating condition at the second speed stage control and a part of the oil pressure supplied to the second friction element 46 is supplied to the line pressure control valve 64 through the ninth line 62 and moves the valve spool of the line pressure control valve 64 to right, then is supplied to the seventh port 82 of the regulator valve 4.

Since the oil pressure flowed to the seventh port 82 of the regulator valve 4 is applied to the fourth land 90 having a larger area than that of the second land 86 as well as of the third land 88, which is related to the line pressure control, the valve spool of the regulator valve 4 is moved to left more than in the first, second speed stages.

Accordingly, the first land 84 of the regulator valve 4 is moved to left further and the opening area of the first, second ports 70, 80 is enlarged and exhausting oil pressure is increased.

As a result, the line pressure is reduced than in the first, second speed stages and it is possible to reduce the drive loss of the oil pump 2.

Figure 7:
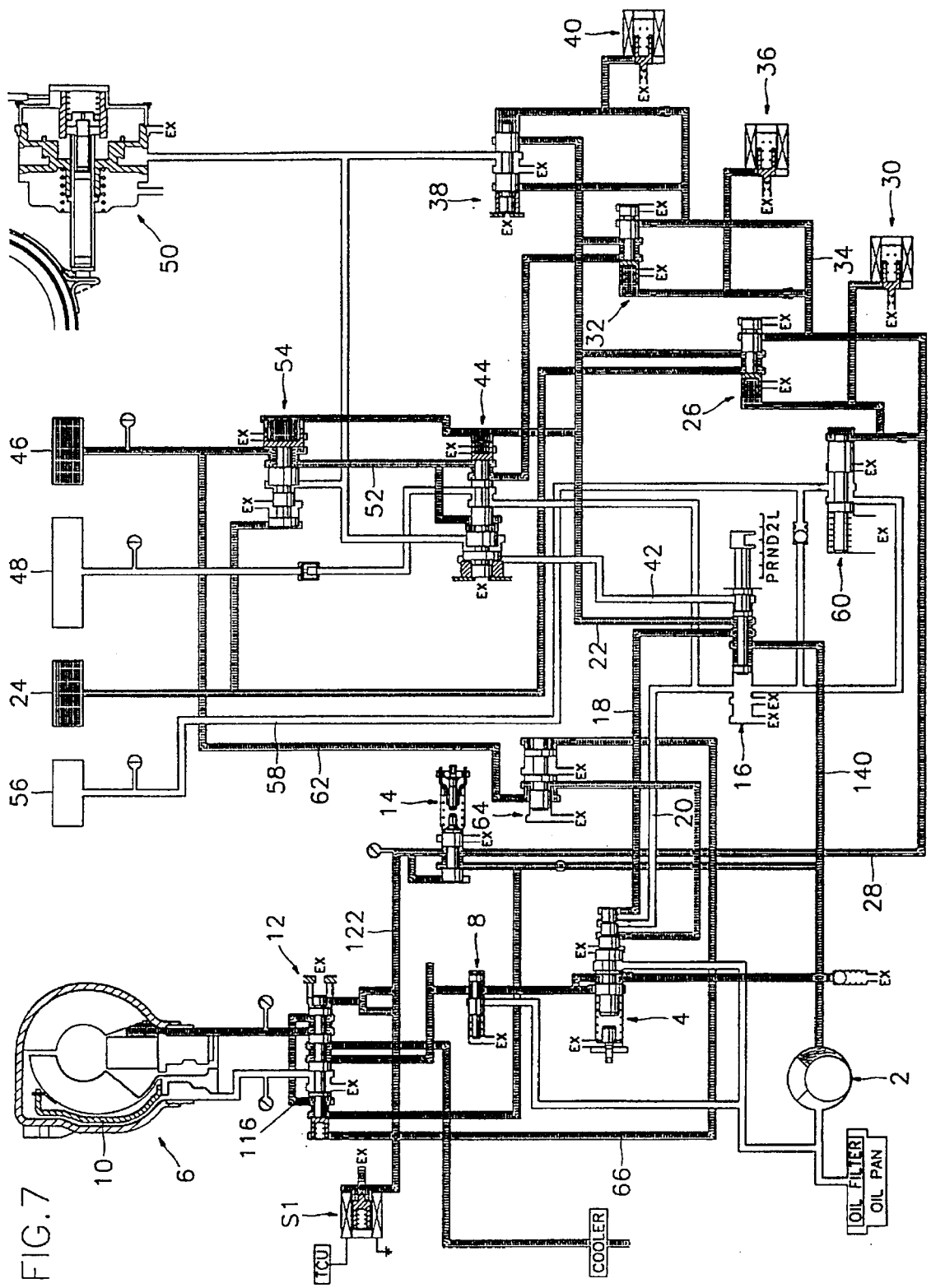
FIG. 7 is a view showing oil pressure control state of the hydraulic control system at the third speed stage in drive "D" range.

Thus the load applied in the oil pump is reduced, it is possible to prevent the deterioration of the output of the engine (refer to FIG. 7).

At this third speed stage, if vehicle speed increases and then the opening of the throttle valve is increased, the transmission control unit controls the first solenoid valve 30 to duty 100% on state and controls the third solenoid valve 40 to duty 100% on state.

The first solenoid valve 30 becomes on state and exhausts the oil pressure in the third port 146 of the first indirect control valve 26, then the valve spool of the first indirect control valve is moved to left by the oil pressure applying the first land through the fourth port 148.

As a result, the oil pressure, which is flowed into the first port 142 of the first indirect control valve 26 from the third line 22 and flows to the second port 144, is obstructed and the oil pressure applying to the first friction element 24 is exhausted through the exhausting port EX, then the operation of the first friction element 24 is released.

Since the second solenoid valve 36 is controlled to off state as in the third speed stage, the second friction element 46 continues to operate, and since the third solenoid valve 40 which is controlled to off state at the third speed stage is controlled to on state, the oil pressure in the fourth port 176 of the third indirect control valve 38 vanishes and the valve spool is moved to right to communicate the first port 170 with the second port 172.

As a result, the oil pressure flowing to the third line 22 is supplied to the fourth friction element 50 through the third indirect control valve 38 and operates the fourth friction element.

Figure 8:
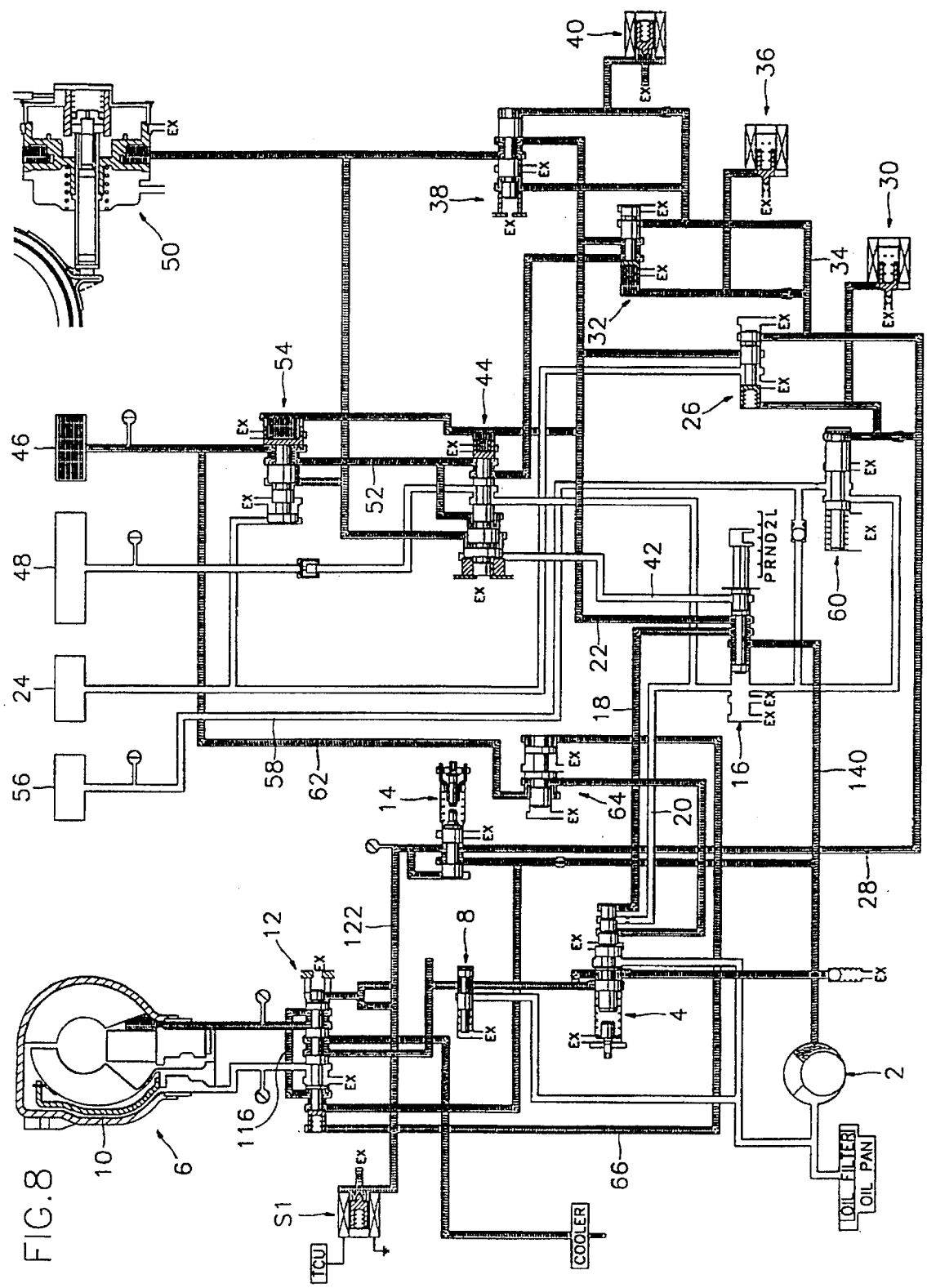
FIG. 8 is a view showing oil pressure control state of the hydraulic control system at the fourth speed stage in drive "D" range.

The fourth speed stage control, in which the second and fourth friction elements operates, is then accomplished (refer to FIG. 8).

This fourth speed stage control also controls the line pressure as the third speed stage control since the oil pressure flows to the ninth line 62 at this fourth speed stage control.

As described above, the hydraulic control system according to the invention controls the line pressure in the third, fourth speed stages to be lower than in the first, second speed stages to minimize the drive loss of the oil pump and controls each friction element through the independent solenoid valves.

Figure 9:
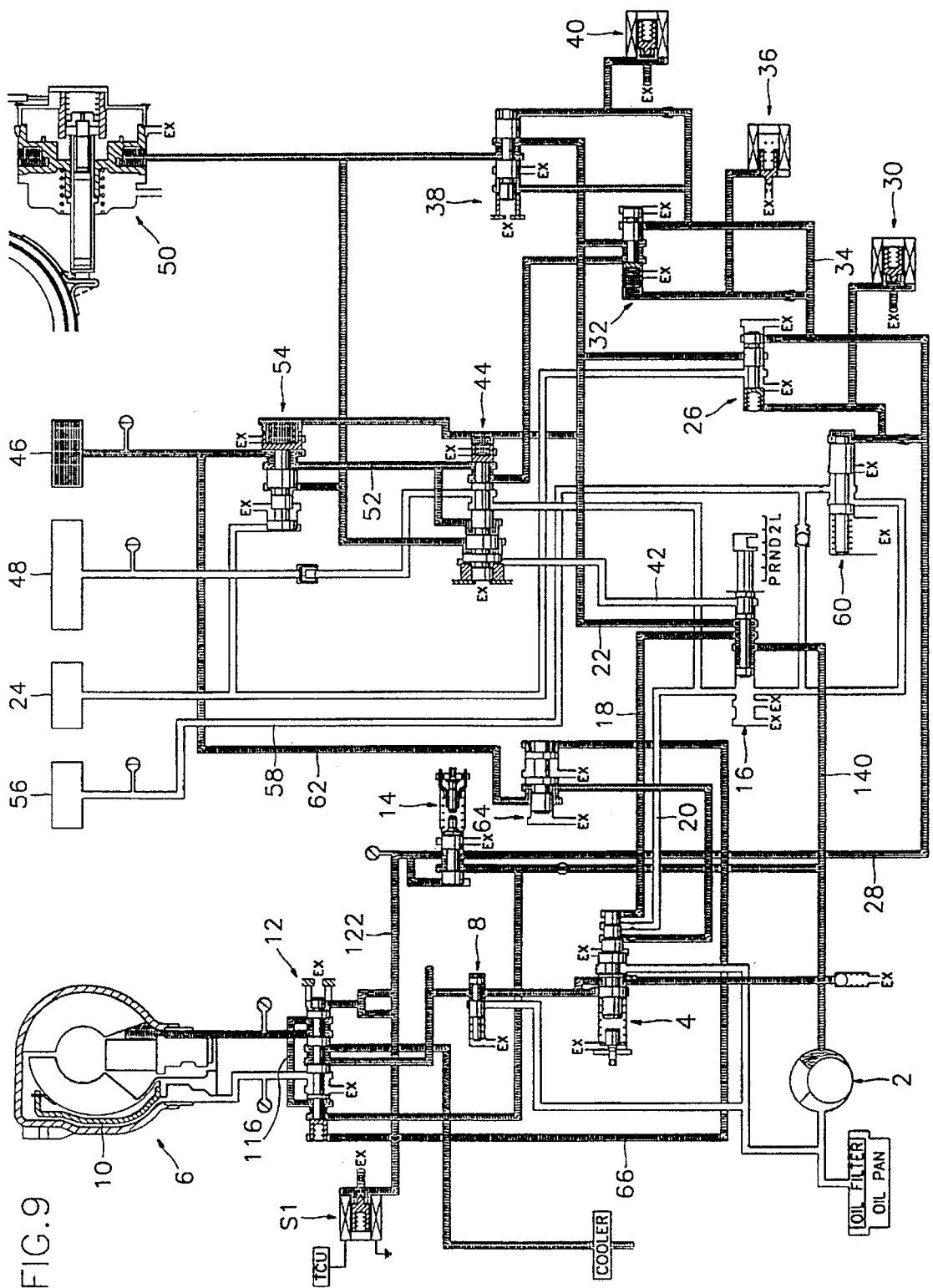
FIG. 9 is a view showing skip control state of the hydraulic control system in drive "D" range.

The independent control makes the skip shift described in FIG. 9 possible and enables fast responsiveness.

That means, the hydraulic control system according to the invention can shift speed stage from the second speed stage to the fourth speed stage or from the fourth speed stage to the second speed stage.

And the hydraulic control system according to the invention uses a plurality of the indirect control valves to supply the oil pressure to the multiple friction elements from one line selectively thus providing a structurally simple design.

If the opening of the throttle valve is reduced abruptly in the second high speed driving condition and the second to fourth skip control condition is satisfied, the transmission control unit controls the first solenoid valve 30 which is off state in the second speed stage into on state and the second solenoid valve 36 which is in on state into off state.

At this time, the duty rate of the first solenoid valve changes from 0% to 100% and the duty rate of the second solenoid valve changes from 100% to 0%. accordingly the first solenoid valve 30 exhausts the oil pressure of the third port 146 of the first indirect control valve 26 and the oil pressure applied to the fourth port 148 moves the first land 150 to left, then the valve spool is moved to left.

As a result, the oil pressure which flows to the second port 144 from the third line 22 through the first port 142 and is supplied to the first friction element 24 is obstructed and the oil pressure which is supplied to the first friction element is exhausted through the exhausting port EX of the first indirect control valve 26.

Since the second solenoid valve 36 is controlled to off state, the oil pressure is formed in the third port 160 of the second indirect control valve 32 and moves the valve spool to right.

Accordingly, the oil pressure in the third line 22 is supplied to the third port 200 of the switch valve 44 through the first and second ports 156, 158 of the second indirect control valve 32.

Since the valve spool of the switch valve 44 is in the left moved position at this time, the oil pressure flowed to the third port 200 is supplied to the second port 316 of the safety valve 54 through the fourth port 202 and since the valve spool of the safety valve 54 is in left moved position, the oil pressure flowed to the second port 316 is supplied to the second friction element 46 through the first port 326.

The third solenoid valve 40 which controls the fourth friction element 50 at the second speed stage continues to be controlled to on state.

Therefore the fourth friction element 50 operates and the fourth speed stage control, in which the second friction element 46 also operates, is feasible.

Figure 10:
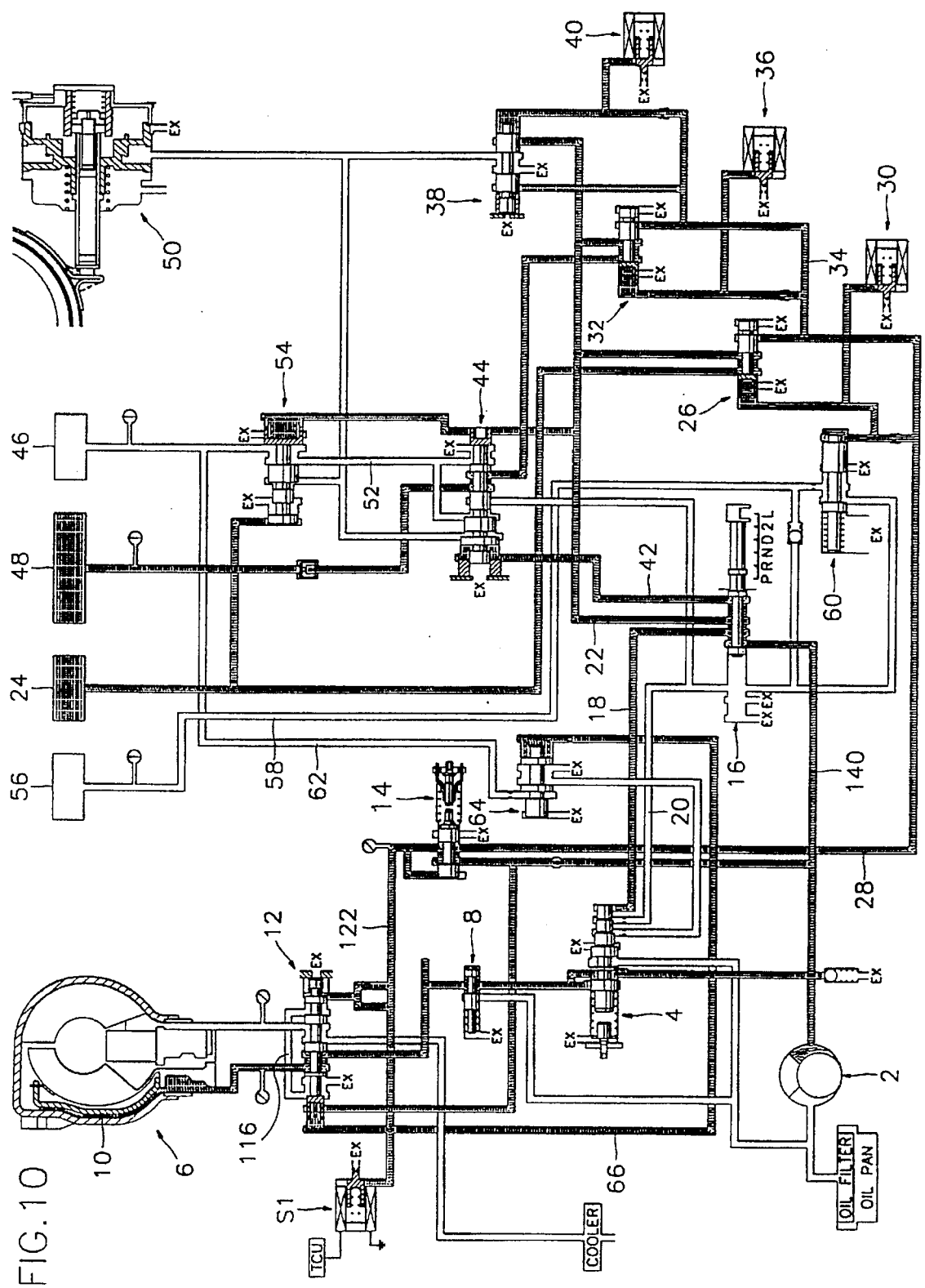
FIG. 10 is a view showing control state of the hydraulic control system in "L" range.

FIG. 10 is a view describing the control when the manual valve is set in the "L" range.

If the shift lever is shifted to the "L" range, the transmission control unit controls the first and third solenoid valves 30, 40 as wsll as the damper clutch control solenoid valve S1 to off state and performs the duty control to the second solenoid valve 36.

At this time, the oil pressure produced in the oil pump 2 flows to the first line 18, third line 22 and the sixth line 42 at the same time.

However, since the first solenoid valve 30 is controlled to off state, the oil pressure in the third line is supplied to the first friction element 24 directly through the first and the second ports 142, 144 of the first indirect control valve 26.

At this time, the oil pressure flowing along the sixth line 42 from the manual valve 16 is flown to the seventh port 208 of the switch valve 44 and is applied to the left side of the fifth land 312 to move the valve spool to right.

And the second solenoid valve 36 is duty controlled and a part of the oil pressure flowing in the third line 22 is supplied to the third port 200 of the switch valve 44 through the first and second ports 156, 158 of the second indirect control valve 32.

As a result, the third port 200 is connected to the fifth port 204 and the oil pressure is supplied to the third friction element 48.

Consequently, "L" range control in which the first and third friction element 24, 48 operate is accomplished.

At this time, the damper clutch control solenoid valve S1 is controlled to off state and keeps the damper clutch 10 in the torque converter 6 inoperative.

Figure 11:
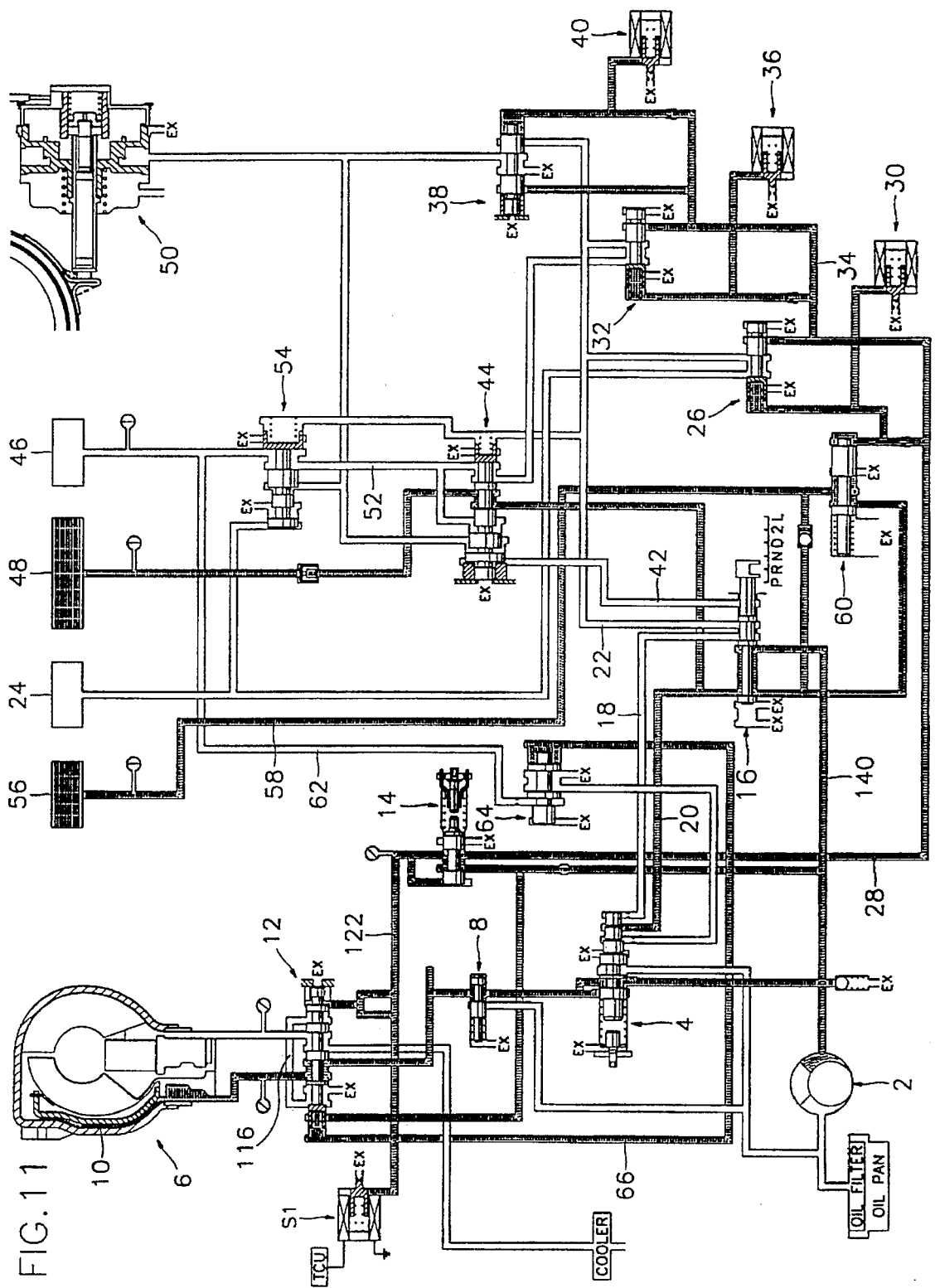
FIG. 11 is a view showing control state of the hydraulic control system in "R" range.

FIG. 11 is a view showing that the hydraulic control system according to the invention performs "R" range control and if the shift lever is selected to the "R" range, the oil pressure supplied to the manual valve 16 flows to the second line 20 and operates to the fifth port 78 of the regulator valve 4 and a part of the oil pressure is supplied to the sixth port 206 of the switch valve 44.

Since no oil pressure is applied to the ports of the switch valve 44 at this time, the valve spool is in a position that is moved to left by resilient member 302.

Accordingly, the oil pressure flowing to the sixth port 206 is supplied to the third friction element 48 through the fifth port 204.

And a portion of the oil pressure is supplied to the first port 184 of the fourth indirect control valve 60.

At this time, the first solenoid valve 30 is controlled to off state, then the valve spool of the fourth indirect control valve 60 is in a position that is moved to left.

Accordingly, the oil pressure flowed to the first port 184 is supplied to the fifth friction element 56 directly through the second port 186 and the rearward driving control in which, the third and fifth friction elements 48, 56 operate, is accomplished.

All of the above controls are accomplished according to a control table in FIG. 12.

What is claimed is:

1. A hydraulic control system of automatic transmission for vehicles comprising:

(a) a torque converter control part including a damper clutch control solenoid valve for increasing power transmission efficiency according to vehicle speed and load and a regulator valve for regulating an oil pressure produced in a oil pump to the constant oil pressure;

(b) a manual valve for supplying the oil pressure supplied from the oil pump to another line according to a shift lever's position;

(c) a first indirect control valve, a second indirect control valve, a third indirect control valve, all of which are supplied the oil pressure if the manual valve is set in drive "D" range;

(d) a first solenoid valve, a second solenoid valve, a third solenoid valve, each of which controls the indirect control valves, respectively;

(e) a first friction element communicating with the first indirect control valve;

(f) a second friction element communicating with the second indirect control valve;

(g) a third friction element communicating with the second indirect control valve;

(h) a fourth friction element communicating with the third indirect control valve;

(i) a switch valve for supplying an operating pressure to the second friction element in drive "D" range and supplying the operating pressure to the third friction element in "L" range selectively; and (j) a safety valve which is connected to the switch valve and prevents a gear train from locking when the operating pressure is applied to the friction elements simultaneously.

2. The hydraulic control system of automatic transmission for vehicles according to claim 1, wherein the manual valve is connected to the switch valve for supplying the oil pressure in the second indirect control valve to the third friction element in the "L" range.

3. The hydraulic control system of automatic transmission for vehicles according to claim 1, wherein the manual valve is connected to a line for supplying the oil pressure to the third friction element through the switch valve directly in "R" range.

4. The hydraulic control system of automatic transmission for vehicles according to claim 1, wherein the operating pressure of the second friction element makes a line pressure down by controlling the regulator valve via the duty control of the damper clutch solenoid valve.

5. The hydraulic control system of automatic transmission for vehicles according to claim 1, wherein the operating pressure of the fourth friction element controls valve spools of the switch valve and the safety valve.

6. The hydraulic control system of automatic transmission for vehicles according to claim 1, wherein the switch valve comprises a first port to which the oil pressure is supplied from the manual valve; a third port to which the oil pressure is supplied from the second indirect control valve; a fourth port supplying the oil pressure flowed to the third port into the safety valve; a sixth port to which the oil pressure is supplied from the manual valve in reverse "R" range; a fifth port for supplying the oil pressure in the third and sixth ports to the third friction element; a seventh port to which the oil pressure is supplied from the manual valve in "L" range; a second port to which the operating pressure of the fourth friction element is applied; and a valve spool for opening or shutting the ports selectively which is moved by force of a resilient member arranged in the valve spool plus the oil pressure of the seventh and second ports.

7. The hydraulic control system of automatic transmission for vehicles according to claim 1, wherein the safety valve comprises a first port to which the oil pressure is supplied from the manual valve; a second port to which the oil pressure is supplied from the switch valve; a third port for supplying the oil pressure flowed to the second port to the second friction element; a fourth port to which the operating pressure of the fourth friction element is applied; and a fifth port to which the operating pressure of the first friction element is applied, and the operating pressure of the second friction element is obstructed for preventing a transmission from locking by the operating pressure of the first, forth, second friction elements.

* * * * *